United States Patent [19]

Carlsson

[11] 4,019,485

[45] Apr. 26, 1977

[54] FLYWHEEL MAGNETO HAVING CAPACITIVE IGNITION SYSTEM

[75] Inventor: Hans Thorsten Henrik Carlsson, Amal, Sweden

[73] Assignee: Aktiebolaget Svenska Electromagneter, Sweden

[22] Filed: Aug. 14, 1974

[21] Appl. No.: 497,296

Related U.S. Application Data

[63] Continuation of Ser. No. 269,764, July 7, 1972, abandoned.

[30] Foreign Application Priority Data

Dec. 3, 1971 Sweden .................. 15572/71

[52] U.S. Cl. .................. 123/148 E; 123/149 D; 310/70 A; 310/153
[51] Int. Cl.² .................. F02P 1/00
[58] Field of Search ....... 123/148 E, 149 R, 149 C, 123/149 D, 148 MC, 123, 148 MLD; 310/70 A, 153

[56] References Cited

UNITED STATES PATENTS

| | | | |
|---|---|---|---|
| 3,447,521 | 6/1969 | Piteo | 123/148 E |
| 3,464,397 | 9/1969 | Burson | 123/148 E |
| 3,484,677 | 12/1969 | Piteo | 123/148 E |
| 3,490,426 | 1/1970 | Farr | 123/148 E |
| 3,498,281 | 3/1970 | Harkness | 123/149 R |
| 3,598,098 | 8/1971 | Sohner | 123/149 D |

*Primary Examiner*—Wendell E. Burns
*Assistant Examiner*—David D. Reynolds
*Attorney, Agent, or Firm*—Hill, Gross, Simpson, Van Santen, Steadman, Chiara & Simpson

[57] ABSTRACT

This invention provides an improvement in a flywheel magneto having a thyristor controlled capacitive ignition system including a flywheel having permanent magnets and at least one cooperating coil core which has three pole legs and at least one charging coil and one trigger coil. The improvement therein comprises a charging coil arranged on the intermediate pole leg of the coil core and a trigger coil being arranged on the last pole leg when viewed in the direction of rotation of the flywheel.

2 Claims, 5 Drawing Figures

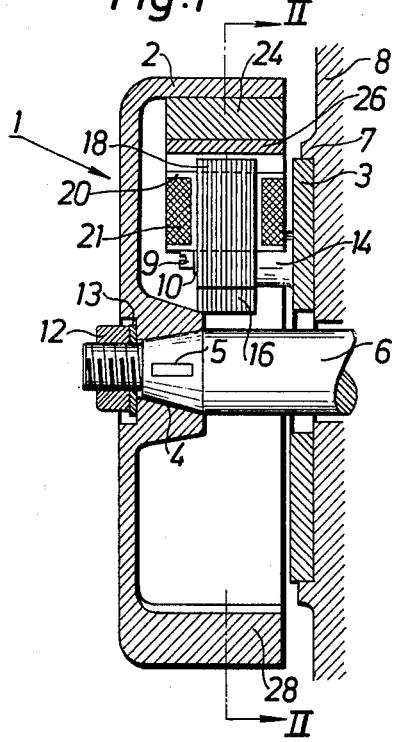
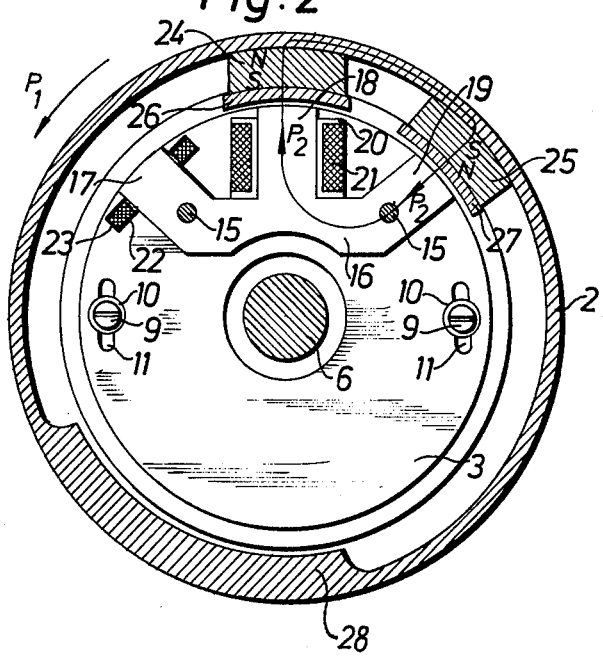

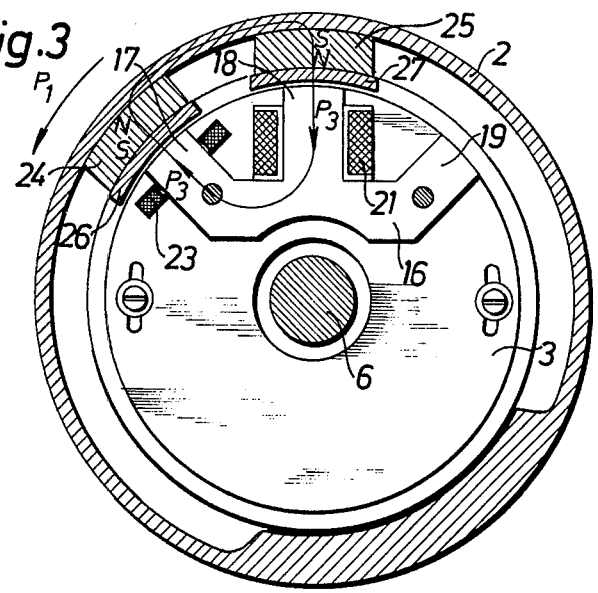
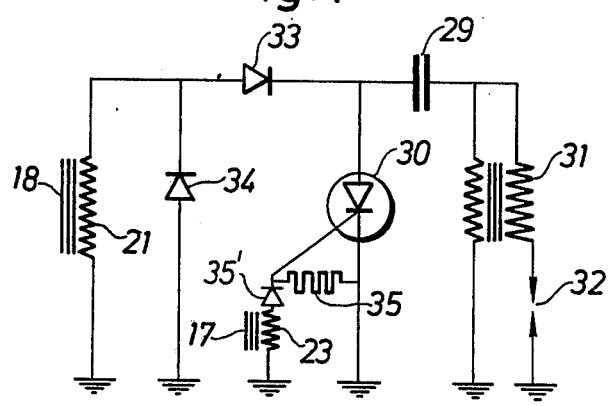
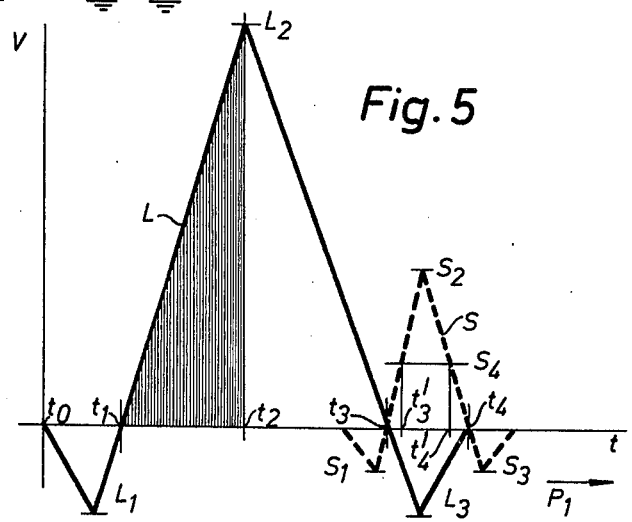

FLYWHEEL MAGNETO HAVING CAPACITIVE IGNITION SYSTEM

This is a continuation of application Ser. No. 269,764, filed July 7, 1972, now abandoned.

BACKGROUND OF THE INVENTION

This invention relates to flywheel magnetos with capacitive ignition systems. More particularly, the invention relates to a flywheel magneto having a thyristor controlled capacitive ignition system which includes a flywheel provided with permanent magnets and at least one cooperating coil core.

One known construction of flywheel magnetos having a capacitive ignition system, has arranged on an iron core in the magneto a charging coil which charges a capacitor which immediately on being charged delivers its energy to the primary winding of the ignition coil in the secondary winding of which is induced a high tension ignition voltage. The capacitor is normally built with the remaining non-rotating components of the magneto on an armature plate while the ignition coil is located externally of the magneto and as close to the spark plug of the internal combustion motor it is associated with in order to avoid energy losses as a result of excessive cable lengths.

The energy stored in the capacitor with each revolution of the flywheel is transmitted to the primary winding of the ignition coil through a control means which at a predetermined time, i.e., when ignition is to take place, closes a circuit between the capacitor and the primary winding. The control means may comprise a conventional mechanical switch but normally consists of a trigger coil which is connected with a charging coil and a thyristor which during a starting sequence closes the current circuit between the capacitor and primary winding of the ignition coil.

The charging of the capacitor and the triggering of the thyristor must be very accurately adjusted in order to obtain optimal ignition effects over the whole range of rotational speed, i.e., from start at idling speeds of 400 r.p.m. up to maximum operational speeds of 10,000 r.p.m. The capacitor should obtain a full charge of the charging coil with each separate revolution and only then be discharged by means of the primary winding of the ignition coil. With this sequence of events, no appreciable nor any distributing displacement between the discharging and charging should occur, and most importantly, a triggering sequence should not effect the charging sequence with the capacitor in a manner to cause the charging to be incomplete.

In another flywheel magneto construction, the core comprises a laminated structure of dynamo sheet provided with three pole legs arranged in uniform spaced relationship. The flywheel is provided, for example, with a pole system which includes two permanent magnets whose size and position are adjusted so that the distance between their central lines coincide with the pole distribution of the iron core, while at the same time the distance between the two opposing side surfaces of the permanent magnets is slightly less than the width of the pole legs of the iron core. The charging coil is on the center pole leg of the iron core and a positive charging pulse of relatively high voltage of about 400 volts is generated each time the magnet system is passed, the positive charging pulse being proceeded and followed by negative pulses of low voltage. The negative pulses are blocked by a first diode, while usually a second diode is connected over the charging coil to eliminate excessive blocking voltages on the first diode.

In order to ensure that the capacitor is charged under all circumstances, the starting coil of known flywheel magneto constructions is arranged on the first pole leg of the iron core when viewed in the direction of rotation of the flywheel, i.e. in front of the charging pole. This arrangement provides a wide safety margin with respect to capacitor charging time, since the flywheels which for example, only cause one ignition sequence for each revolution, rotates almost a complete revolution, e.g. about 320°, before triggering, i.e. before the capacitor is discharged. On the other hand, such a system presents serious difficulties with regard to the possibilities of eliminating the influence of the triggering sequence on the charging sequence immediately following. These difficulties are caused by the fact that the triggering voltage curve and charging voltage curve, owing to armature reaction are not completely stable, but are liable to intersect each other with increasing revolutions. Thus, the trigger voltage is unable to fall while the thyristor opening voltage is applied before the new charging sequence begins. As a result, the thyristor does not break the circuit to allow the capacitor to recharge. A default circuit braking of the thyristor may cause a serious overloading of the electronic components so that they may be damaged. This means in practice that the ignition system with which the trigger coil is arranged on the first pole leg when viewed in the direction of rotation of the flywheel, will function satisfactorily only if the speed range is restricted to, for example, between 700 and 900 r.p.m.

SUMMARY OF THE INVENTION

In view of the disadvantages of prior flywheel magnetos, I have developed an improvement in a flywheel magneto having a thyristor controlled capacitive ignition system. The improvement provides an advantage particularly with respect to the range of speed as to both the starting and idling speeds, and the maximum operation speeds. In such flywheel magneto having a thyristor controlled capacitive ignition system and which includes a flywheel having permanent magnets and at least one coil core which has three pole legs and at least one charging coil and one trigger coil, the improvement comprises a charging coil arranged on the intermediate pole leg of the coil core and a trigger coil arranged on the last pole leg of the coil core when viewed in the direction of rotation of the flywheel.

Therefore, it is an object of the present invention to provide an improvement in a flywheel magneto having a thyristor controlled capacitive system.

Other objects, features and advantages of the invention will be readily apparent from the following description of the preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a cross-sectional view of a flywheel magneto constructed according to the present invention;

FIG. 2 is a cross-sectional view taken along line II—II of FIG. 1, illustrating the pole system of two permanent magnets of the flywheel;

FIG. 3 is a view similar to that of FIG. 2 illustrating the pole system of the permanent magnets of the flywheel in a second position relative to the coil core;

FIG. 4 is a circuit diagram for the ignition system cooperating with the flywheel magneto illustrated in FIGS. 1 to 3; and FIG. 5 is a chart illustrating the curve of the charging voltage applied to the capacitor illustrated in the diagram of FIG. 4.

DESCRIPTION OF THE PREFERRED EMBODIMENTS

FIG. 1 illustrates a flywheel magneto constructed according to the present invention. The flywheel magneto generally indicated by the reference numeral 1, includes a flywheel 2 and an armature plate 3 fixedly mounted concentrically within the flywheel 2. The flywheel 2 by means of a conical point 4 having a key 5, is securely but detachably mounted on a shaft 6 of an internal combustion engine (not shown). The armature plate 3 attached to a guide shoulder 7 located on a wall 8 of the crank case by means of bolts 9 provided with washers 10.

As shown in FIG. 2, elongated, radially extending screw holes 11 are positioned in the armature plate 3 which holes enable the armature plate to be turned to different angular positions to facilitate the accurate setting of the ignition time. The flywheel 2 is held on the shaft 6 by a nut 12 provided with a washer 13.

Attached to the armature plate 3 on a projection 14 by means of screws 15 is a coil core 16 having three pole legs 17, 18 and 19. The intermediate or center leg 18 is provided with a charging coil 21 wound on a bobbin 20 and the pole leg 17 is provided with a trigger coil 23 wound on a bobbin 22. The direction of rotation of the flywheel 2 is illustrated by the arrow $P_1$, and as shown in FIG. 2, the trigger coil 23 is arranged on the last pole leg 17 of the coil core 16 when viewed in the direction of rotation $p_1$ of the flywheel.

The flywheel 2 is provided with two permanent magnets 24 and 25 having soft-iron pole shoes 26 and 27, respectively. In the preferred embodiment, the flywheel 2 is made of soft iron and is thus magnetically conductive. The permanent magnets 24 and 25 are magnetized with an orientation of north and south poles, respectively, as indicated by the letters N and S, as shown in FIGS. 2 and 3. At the position indicated by the reference numeral 28, i.e.. at the position diametrically opposite the permanent magnets 24, 25, the thickness of the flywheel is increased to counteract and balance the weight of the magnets. Alternatively, a block or member may be provided as a counerweight at 28. The additional weight provided on the flywheel corresponds to the total weight of the permanent magnets 24 and 25, and the pole shoes 26 and 27, so that the dynamic equilibrium is maintained during rotation of the flywheel 2.

When the system of permanent magnets and pole shoes passes the coil core 16, an alternation in flux is obtained, as indicated by the arrows $P_2$ and $P_3$. At a first instantaneous position, as illustrated in FIG. 2, in which the permanent magnets 24 and 25 are located opposite the pole legs 18 and 19, a maximum magnetic flux is obtained through the pole legs 18, 19 as shown by the arrows $P_2$. When the flywheel 2 moves to a second instantaneous position, as illustrated in FIG. 3, the permanent magnets 24 and 25 are located opposite the pole legs 17 and 18, therewith a corresponding maximum flux occurs through the pole legs 17, 18 as shown by the arrows $P_3$. As indicated by the arrows $P_2$ and $P_3$, the two maximum fluxes act in opposite directions, which means that a maximum variation in flux linkage takes place from the first position, as shown in FIG. 2, to the second position, as shown in FIG. 3. During this period, a charge voltage is generated in the charging coil 21, as indicated by the curve L in the graph of FIG. 5, and described hereinbelow. When the permanent magnets 24 and 25, in the position shown in FIG. 3, pass the pole legs 17 and 18, a voltage pulse is also generated through the trigger coil 23. This pulse, as illustrated by the dash-line curve S in the graph of FIG. 5, is of less voltage than the charge voltage generated by the coil 21.

The manner in which the charging voltage L and the trigger voltage S work in the ignition system is indicated in the circuit diagram of FIG. 4, in which the charging coil 21 on the pole leg 18 and the trigger coil 23 on the pole leg 17, are graphically illustrated. As illustrated, the circuit includes a capacitor 29, a thyristor 30, an ignition coil 31, and a spark plug 32 connected to the secondary winding of the coil 31. Further, the circuit includes a first diode 33 and a second diode 34, and a shunt system which includes a fixed resistance 35 and a diode 35' connected in series, respectively, between the trigger coil 23 and the thyristor 30, and between the trigger coil and the resistance 35. The size of the resistor 35 affects the triggering threshold described below. The function of the second diode 34 is to reduce the reverse voltage action when the voltage swing goes negative with respect to the rectifier or first diode 33.

The graph of FIG. 5 has the voltage ($V$) plotted along the Y-axis and the time ($t$) i.e. the angular rotation of the flywheel 2, is plotted along the X-axis. The time ($t$) moves in the same direction as the direction of rotation of the flywheel 2, i.e. in the direction shown by the arrow $P_1$. It will be apparent from the aforesaid magnetic flux relationship concerning the embodiments of FIGS. 2 and 3 that the charge voltage L from a time ($t_0$), as shown in FIG. 5, first obtains a virtically low negative voltage peak $L_1$ and then returns to the value zero at a time ($t_1$). The charge voltage L then rises to a high positive voltage peak with a value $L_2$ at a time ($t_2$) and then falls so that at time ($t_3$) it obtains the value 0 before it is reformed with a negative voltage peak $L_3$ of approximately the same magnitude as the voltage peak $L_1$, whereafter the voltage again rises to 0 at the time ($t_4$). The charging curve L is rectified by the first diode 33, so that only the positive, rising portion up to the voltage peak $L_2$ is transmitted to the capactior 29 to charge the same. Charging takes place primarily during the first half of the curve because when the pulse has reached a maximum potential, this potential also is the uppermost voltage utilized in charging the capacitor. When the positive voltage drops during the last half of the pulse, the rectifier or diode 33 prevents discharging of the capacitor 29 through the charging coil 21, and the capacitor is then fully charged until the thyristor 30 closes the circuit which includes the capacitor 29 and the primary winding of the transformer 31.

In a similar manner there is generated in the trigger coil 23 a voltage indicated by the dash-line curve S, having two negative voltage maxima $S_1$ and $S_3$, and a positive voltage maximum $S_2$. As can be seen from FIGS. 2, 3 and 5, the magnetic flux through the core 16 is zero at time ($t_2$) and at the maximum voltage for the negative voltage peaks $L_1$ and $L_3$, and the maximum flux variation prevails at the times $(t_1)$ and $(t_3)$. If follows from this that the point of time $(t_3)$ is a common point for the charging curve L and for the trigger voltage curve S, in which the voltage for each is zero.

The voltage level at which the thyristor 30 is triggered is marked in FIG. 5 with a horizontal voltage line $S_4$ which intersects the curve S for the trigger voltage at a time $(t_3)$, when the thyristor 30 closes the circuit over the capacitor 29 and the primary winding to the ignition coil 31, and a time point $(t_4)$ when the trigger voltage falls beneath the voltage level $S_4$ so that the thyristor 30 reopens.

Thus, it is evident, that when the capacitor is charged, only the left shadowed portion of the voltage curve L is used and that a time interval, significant in view of the time taken to effect the described sequences, is found between the time $(t_2)$, when the capacitor is fully charged, and the time $(t_3)$ when the capacitor, during the triggering of the thyristor 30 by the voltage $S_4$, is discharged via the primary winding on the ignition coil 31 so that a spark is created in the spark plug 32.

In practice, the time interval $(t_3)$ to $(t_2)$ has been fund sufficiently long to eliminate all interference between the sequence for the trigger voltage as shown in curve S and the charging voltage as shown in curve L, even when the operational rotational speed is at very high levels, e.g. of the speed of 13,000 r.p.m.

In order for a known system to reach acceptable maximum values with respect to operational rotational speeds, e.g. of the speed of 9,000 r.p.m. it would have been necessary to increase the start and idling speeds, for example, to 700 r.p.m. The arrangement of the present invention eliminates the necessity of such a restriction with respect to the range of speeds, and the idling speed can be lowered to, for example 400 r.p.m., while at the same time a maximum operating speed of 13,000 r.p.m. can be maintained.

Although the invention has been described with reference to a particular embodiment thereof, it will be understood that the invention is not restricted thereto, but can be modified within the scope of the appended claims. Thus, instead of a flywheel magneto constructed to effect ignition solely with each revolution, the invention can be applied with flywheel magnetos where one or two ignition sequences are carried out with each revolution, a number of coil cores correpsonding to the number of desired ignition sequences being arranged on the armature plate, wherein each of the coils is provided with a charging coil and a trigger coil.

Alternatively, the flywheel can be provided with several systems of magnet pieces arranged in pairs and having pole shoes for each of the desired ignition points with the spark distribution to the different spark plugs being effected through a distributor.

I claim as my invention:
1. An ignition system comprising:
   a. a flywheel having a plurality of permanent magnets with pole faces directed toward the rotational axis of the flywheel;
   b. a ferromagnetic coil disposed inside said flywheel and comprising superimposed laminations, each individual lamination having three pole legs whose ends are disposed adjacent to the rotational path of said pole faces;
   c. a charging coil disposed on the intermediate pole leg of said coil core;
   d. a trigger coil disposed on the last leg of said coil core when viewed in the direction of rotation of the flywheel;
   e. a charging circuit including said charging coil, a rectifier, a storage capacitor, and the primary winding of an ignition transformer, all connected together in a single series, said transformer having a secondary winding adapted to be connected in circuit with a spark plug;
   f. a thyristor connected by its anode and its cathode across a portion of said charging circuit including the series-connected capacitor and the primary winding; and
   g. means connecting one end of said charging coil to the anode of said thyristor, the other end of said charging coil being connected (1) through said trigger coil and a diode to the control terminal of said thyristor, and (2) through a resistor to said control terminal.

2. An ignition system according to claim 1 in which said coil core legs embrace over 90° of the rotational path of said pole faces.

* * * * *